United States Patent
Varadarajan (10) Patent No.: US 8,843,757 B2
(45) Date of Patent: Sep. 23, 2014

(54) ONE TIME PIN GENERATION

(75) Inventor: Rammohan Varadarajan, Cupertino, CA (US)

(73) Assignee: CA, Inc., Islandia, NY (US)

(*) Notice: Subject to any disclaimer, the term of this patent is extended or adjusted under 35 U.S.C. 154(b) by 578 days.

(21) Appl. No.: 12/943,200

(22) Filed: Nov. 10, 2010

(65) Prior Publication Data

US 2011/0113245 A1 May 12, 2011

Related U.S. Application Data

(60) Provisional application No. 61/260,635, filed on Nov. 12, 2009.

(51) Int. Cl.
| | |
|---|---|
| *G06F 21/00* | (2013.01) |
| *G06Q 20/22* | (2012.01) |
| *G07F 7/10* | (2006.01) |
| *G06Q 20/38* | (2012.01) |
| *G06Q 20/18* | (2012.01) |
| *G06Q 20/34* | (2012.01) |
| *G06F 21/34* | (2013.01) |
| *G06Q 20/32* | (2012.01) |
| *G07F 7/12* | (2006.01) |

(52) U.S. Cl.
CPC .............. *G06Q 20/32* (2013.01); *G06Q 20/227* (2013.01); *G07F 7/1075* (2013.01); *G06Q 20/385* (2013.01); *G06Q 20/18* (2013.01); *G06Q 20/3552* (2013.01); *G06F 21/34* (2013.01); *G07F 7/122* (2013.01)
USPC .............. 713/184; 713/168; 713/175; 726/10

(58) Field of Classification Search
CPC ........... G06F 21/34; G06Q 20/18; G07F 7/10; G07F 7/1075
USPC .............. 726/10; 713/168, 175, 184
See application file for complete search history.

(56) References Cited

U.S. PATENT DOCUMENTS

| | | | |
|---|---|---|---|
| 5,206,905 A | 4/1993 | Lee et al. | |
| 6,044,154 A | 3/2000 | Kelly | |

(Continued)

FOREIGN PATENT DOCUMENTS

| | | |
|---|---|---|
| FR | 2823401 A1 | 10/2002 |
| WO | 2007/006771 A1 | 1/2007 |

(Continued)

OTHER PUBLICATIONS

Diego Alejandro Ortiz-Yepes, Enhancing Authentication in eBanking with NFC enabled mobile phones, Aug. 11, 2008, Department of Mathematics and Computer Science, Master's Thesis, pp. 1-96.*

(Continued)

*Primary Examiner* — Chau Le
(74) *Attorney, Agent, or Firm* — Vierra Magen Marcus LLP (57) ABSTRACT

A method and system is provided for generating a one-time passcode (OTP) configured for use as a personal identification number (PIN) for a user account from a user device. The OTP may be generated using an OTP generator which may include an algorithm an user account-specific OTP key. The OTP key may be camouflaged by encryption, obfuscation or cryptographic camouflaging using a PIN or a unique machine identifier defined by the user device. Obtaining an OTP from the user device may require inputting a data element which may be one of a PIN, a character string, an image, a biometric parameter, a user device identifier such as an machine effective speed calibration (MESC), or other datum. The OTP may be used for any transaction requiring a user PIN input, including ATM and debit card transactions, secure access and online transactions.

15 Claims, 4 Drawing Sheets

(56) References Cited

U.S. PATENT DOCUMENTS

| | | |
|---|---|---|
| 6,956,950 B2 | 10/2005 | Kausik |
| 7,454,782 B2 | 11/2008 | Rajasekaran et al. |
| 7,743,409 B2 * | 6/2010 | Gonzalez et al. ............. 726/9 |
| 2002/0073046 A1 | 6/2002 | David |
| 2002/0083327 A1 * | 6/2002 | Rajasekaran et al. ......... 713/182 |
| 2002/0141575 A1 | 10/2002 | Hird |
| 2004/0059952 A1 * | 3/2004 | Newport et al. ............. 713/202 |
| 2004/0114765 A1 | 6/2004 | Liardet et al. |
| 2004/0128201 A1 | 7/2004 | Ofir et al. |
| 2004/0131182 A1 | 7/2004 | Rogaway |
| 2005/0033974 A1 | 2/2005 | Ansell et al. |
| 2005/0132031 A1 | 6/2005 | Sailer et al. |
| 2006/0020783 A1 | 1/2006 | Fisher |
| 2006/0080545 A1 | 4/2006 | Bagley |
| 2006/0136739 A1 | 6/2006 | Brock et al. |
| 2007/0016941 A1 * | 1/2007 | Gonzalez et al. ............. 726/9 |
| 2007/0088952 A1 * | 4/2007 | Hewitt et al. ............... 713/171 |
| 2007/0130463 A1 | 6/2007 | Law et al. |
| 2007/0133591 A1 | 6/2007 | Shatford |
| 2007/0214406 A1 | 9/2007 | Rhoads et al. |
| 2008/0137861 A1 * | 6/2008 | Lindmo et al. ............... 380/270 |
| 2008/0201577 A1 * | 8/2008 | Tuliani ....................... 713/168 |
| 2008/0282209 A1 | 11/2008 | Anderson et al. |
| 2008/0301461 A1 | 12/2008 | Coulier et al. |
| 2009/0048971 A1 | 2/2009 | Hathaway et al. |
| 2009/0172402 A1 * | 7/2009 | Tran ........................... 713/170 |
| 2009/0172775 A1 * | 7/2009 | Mardikar et al. ............. 726/2 |
| 2009/0185687 A1 | 7/2009 | Wankmueller et al. |
| 2009/0320118 A1 | 12/2009 | Muller et al. |
| 2009/0328165 A1 * | 12/2009 | Cook et al. .................. 726/6 |
| 2010/0107229 A1 * | 4/2010 | Najafi et al. ................. 726/6 |
| 2010/0304819 A1 | 12/2010 | Stockdale et al. |

FOREIGN PATENT DOCUMENTS

| | | |
|---|---|---|
| WO | 2009/001020 A1 | 12/2008 |
| WO | 2009/025905 | 2/2009 |
| WO | 2009/095263 | 8/2009 |

OTHER PUBLICATIONS

PCT Search Report dated Feb. 11, 2002 for PCT/US2010/056299 filed Nov. 10, 2011.

PCT Search Report dat Feb. 3, 2011 for PCTUS2010/055382 filed Nov. 4, 2010.

Office Action dated Aug. 9, 2012, U.S. Appl. No. 12/871,559, 27 pages.

Response to Office Action dated Aug. 9, 2012, U.S. Appl. No. 12/871,559, filed Nov. 9, 2012 21 pages.

Final Office Action dated Dec. 17, 2012, U.S. Appl. No. 12/871,559 26 pages.

Appeal Brief filed in response to Final Office Action of Dec. 17, 2012, U.S. Appl. No. 12/871,559 26 pages.

Notice of Allowance dated Jun. 24, 2013, U.S. Appl. No. 12/871,559, 17 pages.

Preliminary Amendment filed Apr. 18, 2014, U.S. Appl. No. 14/195,303.

Office Action Sep. 14, 2012, U.S. Appl. No. 12/938,666, 39 pages.

Response to Office Action of Sep. 14, 2014, U.S. Appl. No. 12/938,666, filed Dec. 14, 2012, 20 pages.

Notice of Allowance dated May 10, 2013, U.S. Appl. No. 12/938,666, 26 pages.

Rubin, Aviel D. "Independence One-Time Passwords", Jun. 1995, USENIX UNIX Security Symposium, all pages.

* cited by examiner

ONE TIME PIN GENERATION

CROSS-REFERENCE TO RELATED APPLICATIONS

This application claims the benefit of U.S. Provisional Patent Application No. 61/260,635, filed on Nov. 12, 2009, which is hereby incorporated by reference in its entirety.

TECHNICAL FIELD

The present application relates to generating a one-time personal identification number (PIN), also known as a one-time passcode (OTP), on a user device such as a mobile phone or personal digital assistant (PDA).

BACKGROUND

End-user security of automatic teller machine (ATM) and debit cards primarily depends on the user to hold and keep the card safe, and to keep the user's personal identification number (PIN) secret. Cards are usable in more environments, including for online purchasing. Users are subject to attacks from many venues, such as "phishing" attacks on the account PIN itself. The static nature of the magstripe data on the ATM card and the use of a static account PIN aggravates the problem. During the life of the ATM or debit card, which may be typically up to three years, the magstripe data and PIN do not change, e.g., the magstripe data is static, and the PIN is static. The same static PIN is used to authorize each and every transaction conducted with the ATM card on the user's account. If an attacker obtains the card and PIN, he can easily compromise the account, which may go undetected until the user reviews an account statement, or an event such as an overdraft notifies the user that the account has been compromised.

The security of PIN authorized transactions, such as ATM transactions, is vulnerable to a number of attack methods, which may include the debit or ATM magstripe being read by a skimmer or similar device attached to an ATM terminal, point-of-sale (POS) terminal or other form of magnetic card reader. The card can be "cloned" using the magstripe information obtained from the skimmer. The user's static PIN can be obtained by visual observation of the PIN being entered into an ATM or POS terminal, which may be facilitated, for example, by a surveillance camera or other recording device. The user's static PIN can be obtained by other means, for example, during an online transaction where the PIN, which is not protected cryptographically prior to input into the online interface, and other account data may be recorded and obtained using a "Trojan" type virus or other malicious virus to record and retrieve the account information and PIN for use in subsequent attacks on the user's account.

SUMMARY

A system and method is provided to replace the personal identification number (PIN) for a user account with a dynamic PIN structure, wherein a unique, single use PIN, also referred to as a one-time PIN (OTP) or one-time passcode (OTP), is provided by a user accountholder's mobile device for use with a single account transaction. In a non-limiting example, the user account may be an ATM or debit account associated with a user ATM/debit card, the transaction interface may be an ATM terminal, point-of-sale terminal, or an online interface such as a website, and the account transaction may be an automated teller machine (ATM) transaction, a debit card transaction which may be a POS transaction, an online transaction, or other transaction requiring the user to provide a user PIN to authorize the transaction. The OTP generated by the user device may be configured or provided in the same form as the account PIN for which the OTP is substituted to authorize a user transaction.

A method for generating a one-time passcode (OTP) on a user device is provided. The method includes providing an OTP application to the user device, camouflaging a key defined by a user account to provide an OTP key, providing the OTP key to the user device and generating the OTP on the user device using the OTP application and the OTP key. The OTP may be configured for input as a PIN into a transaction interface. The method may further include inputting the OTP to a provider system using the transaction interface, determining whether the OTP is an authentic PIN for the user account, and providing an authorization result to the transaction interface using the provider system. An authenticating OTP may be generated by the provider system or provided from a list of acceptable OTPs for the user account, such that the OTP may be compared to the authenticating OTP to determine a match between the OTP and the authenticating OTP; and to verify the OTP as an authentic PIN for the user account when the OTP matches the authenticating OTP.

A method for activating an OTP generator on the user device is described. The OTP generator may include an OTP key derived from a key defined by the user account, and the OTP generator may be selected on the user device to generate the OTP for the user account. The key defined by the user account may be camouflaged by at least one of a PIN and a machine effective speed calibration (MESC) and by using at least one of encryption, obfuscation and cryptographic camouflage. The key may be configured as one of a symmetric key, a DES key, an AES key, a non-symmetric key, a secret, a secret byte array, a UDKA, a UDKB, a seed and an indexed key list.

The method may require providing a data element to the user device to activate the OTP generator, or to access the OTP application to generate an OTP. The data element may be one of an account PIN and a machine effective speed calibration (MESC) defined by the user device. The method may include providing an OTP generating algorithm to the OTP application or OTP generator which may be configured as one of a HOTP and an EMV/CAP algorithm.

The OTP generated by the user device for input as a PIN into a transaction interface may be configured as one of a character string, a machine effective signal calibration (MESC), a datum or an electronic signal transmittable from the user device, a datum or an electronic signal generated by the user device, an image, and a response to an instruction. The OTP may be input into a provider interface through the use of at least one of a keypad, touchpad, scanner, speaker, receiver, transponder, receptor, and device configured for use with at least one of RFID, contactless, Bluetooth, WiFi, proximity card and near field communication technologies.

A system for generating a one-time passcode (OTP) from a user device is provided, the system comprising a provider system configured to provide an OTP application, which may include an OTP generator and an OTP key. The provider system may be configured to camouflage a key defined by a user account with at least one of a PIN and a machine effective speed calibration (MESC) and may use at least one of encryption, obfuscation and cryptographic camouflaging to provide the OTP key. The system further includes a user device configured to receive the OTP application and the OTP key; wherein the OTP application is configured to generate an OTP for a user account. The OTP generator may include an OTP generating algorithm, such as one of a HOTP and an EMV/CAP algorithm.

The OTP is configured for input as a PIN into a transaction interface, and the transaction interface is configured to receive the PIN. The transaction interface may be one of an automatic teller machine (ATM) terminal and a point of sale (POS) terminal, and the user account may be one of an ATM account and a debit account.

The above features and advantages and other features and advantages of the present invention are readily apparent from the following detailed description of the best modes for carrying out the invention when taken in connection with the accompanying drawings.

DETAILED DESCRIPTION

A system and method is provided to replace the personal identification number (PIN) for a user account with a dynamic PIN structure, wherein a unique, single use PIN, also referred to as a one-time PIN (OTP) or one-time passcode (OTP), is provided by a user accountholder's mobile device for use with a single account transaction. In a non-limiting example, the user account is an ATM or debit account associated with a user ATM/debit card, and the account transaction is an automated teller machine (ATM) transaction, or a debit card transaction which may be a point-of-sale (POS) transaction, an online transaction, or other transaction requiring the user to provide a user PIN to authorize the transaction. The OTP generated by the user device may be configured or provided in the same form as the account PIN for which the OTP is substituted to authorize a user transaction. For example, if the user account PIN is a string of four alpha-numeric characters, the OTP will also be configured as a string of four alpha-numeric characters. In this way the dynamically generated OTP can be used in any context where the static PIN could have been used; for direct input into an ATM; input into a website for an online purchase; written on a mail order form or provided verbally in a telephone transaction, by way of non-limiting example. The user device is provided with an OTP application including at least one user account-specific OTP key configured to dynamically generate an OTP useable as a user PIN for a user account.

As referred to herein, an "account PIN," which may also be referred to as a "static PIN," refers to the PIN provided to the account holder by the account provider for use by the account holder to authorize transactions on the user's account through a transaction interface such as an ATM terminal or POS interface. Typically, the user account PIN is a static, or fixed datum, for example, a string of four alpha-numeric characters, which may remain unchanged for the life of the account, or which may be infrequently changed, for example, changed when an account card, such as an ATM or debit card associated with the user account is lost, stolen or reissued. The account PIN may be defined or assigned by the account provider, or the account provider may allow the account holder to select the account PIN, for example, by selecting four alpha-numeric characters of the account holder's preference.

In a non-limiting example, the generated OTP is provided as a verifiable or authentic PIN which may be substituted for the account PIN in a PIN-required financial transaction, e.g., an ATM transaction or point of sale (POS) debit transaction using a user or account holder card which may be an ATM or debit card. The POS transaction may be a debit transaction in a "brick and mortar" or a payment or purchase made through an online POS system. The system and method described herein to generate an OTP from a user device can be adapted to any system where a PIN input is required for access, approval, authorization or authentication, e.g., for secure access to an online system, computer network, database, etc., or online authentication of personal identity or approval of a transaction, or for any other representation of an account number or user identification which is used in conjunction with a PIN for a transaction, authorization or authentication. For example, the card may be a medical insurance card with a magnetic stripe and the PIN may be required for the release of medical information, authorization of a prescription or authentication of the patient subscriber to the insurance provider. For another example, the card may be a credit card which requires PIN authorization for some or all transactions. As another example, the card may be a secure access card used with a card reader and PIN pad for authorization to a secured area, which may be a physical area, such as a building, or to secure network or database.

By definition the OTP can only be used one-time, for a single PIN-required transaction. For the next card use, e.g., for the next PIN-required transaction, another different OTP must be generated by the OTP generator on the user device and provided to the user cardholder. This effectively prevents many attacks on PIN-required transactions. For example, when an attacker has attached a "skimmer" to an ATM, the skimmer can capture the magstripe data as the card is swiped to initiate a transaction, and can record the OTP entered to authorize the transaction. The user may complete the transaction unaware that the user's card magstripe data and the inputted OTP have been obtained by the attacker. However, since the OTP has been used for the transaction just completed, the same OTP cannot be used again, so a subsequent attack using the skimmed magstripe and the already used OTP is foiled. Even if the attacker were to prevent the user's first (legitimate) transaction and use the OTP himself, the attacker is limited to at most one fraudulent transaction using the OTP, thereby substantially limiting the threat to the user's account.

The system as described herein requires the user, who may also be referred to as the cardholder, in the non-limiting example where the user is conducting PIN-authorized transactions using a transaction interface, such as an ATM, and the user's ATM card, to install and enroll an application for generating OTPs usable as a PIN for the user's ATM card on the user's device. The user device may be a handheld mobile user device, such as a mobile phone, a "smart" phone, personal digital assistant (PDA), netbook or notebook. The OTP application may be configured with one or more OTP generators, where each one of the OTP generators is defined by a specific user account. For example, a first OTP generator may be configured for the user's ATM card for a first bank account, and a second OTP generator may be configured for the user's debit card for a second bank account. The system and method described herein may also be provided and securely hosted in JavaScript™ within a browser used by a desktop computer, laptop, netbook, or other Internet accessible computing device, to provide OTPs, for example, for online transactions. The OTP generating software client can be further configured to be secured for use exclusively with that unique user device, by incorporating a machine identification parameter derived as a machine effective speed calibration (MESC) in the OTP application and authentication process.

The OTP generator may use an industry-standard algorithm for OTP generation, including a HMAC-Based One-Time Password algorithm, also referred to as HOTP (from the Open Authentication initiative), and a Europay, MasterCard and Visa Chip Authentication Program algorithm, also referred to as EMV/CAP, a payment industry OTP standard first developed by MasterCard, or may use a customized algorithm. The OTP generator is defined by a key or secret associated with the user's account, e.g., with the user's ATM or debit card, where the key or secret may be encrypted or obfuscated using a method of cryptographic camouflaging as described herein to provide an OTP generation key, also referred to as an OTP key. The key or secret may be camouflaged using a PIN such as the user account PIN, a machine identifier such as a machine effective speed calibration (MESC) as described herein, which is defined by and unique to the user's device, another data element, or a combination of two or more of a PIN, a MESC and a data element.

To use the OTP generator, the user selects the OTP generator associated with the user ATM card with which the user is planning to conduct a transaction, from the OTP application on the user's mobile device. The user may obtain an OTP from the user device by opening or selecting the OTP application on the user device, and if required, selecting a "generate OTP" button or similar command, with no requirement for the user to input a PIN, e.g., the OTP is generated and provided without any further user input. Alternatively, the user may be required to enter the user's account PIN for the ATM card to be used for the transaction, or another data element, for example, an MESC or a transaction amount, which may be used to authenticate the user to the OTP application, to generate the OTP, or to authenticate the user or user transaction to an authenticating server.

The OTP generator uses the camouflaged key to generate an OTP, which is provided to the user for use as a PIN input for a single user transaction, for example, for entry into the ATM to authorize the planned ATM transaction. If the user chooses to conduct a subsequent ATM session with the same ATM card where a subsequent PIN input is required, the user repeats the process, selecting the OTP generator on the user's device to generate another OTP which is inputted to an ATM system to authorize the subsequent transaction.

The generated OTP is provided over the ATM network to the user's bank or provider system. The provider system, e.g., the bank issuing the user's ATM card used for the transaction, is configured to verify the OTP generated by the user device as an authentic PIN associated with the user's ATM card, to authorize an ATM transaction. The provider system may be configured to generate an authenticating OTP, for comparison with the generated OTP inputted into the ATM, to verify the generated OTP as an authentic PIN for the user's ATM card, and thereby determine an authorization result for the ATM transaction.

The methods and system for generating OTPs provided herein is configurable for implementation on mobile and hand-held devices, including modern phones, smart phones and PDAs. The OTP application can be configured with a plurality of OTP generators, where each OTP generator may be branded and displayed by the OTP application with provider-specific logos, for example, the logo of the bank issuing a respective ATM or debit card associated with a respective one of the plurality of OTP generators configured on the user device. The keys used to generate the OTPs may be protected using cryptographic camouflage, which may also incorporate machine identification techniques such as the use of a machine effective speed calibration parameter, or MESC. This provides strong protection of the OTP-generation keys, such that even if an attacker steals the user's mobile phone, he cannot crack the keys to generate his own OTPs. The resulting solution is strong, portable, and easy to use, thus providing benefits for both the bank and the end user.

Additional advantages can be realized with the ability to securely host the software client (OTP generating application) on a variety of mobile phones and user handheld devices (iPhone™, Blackberry™, etc.), including increased user convenience, for example, by not requiring a user to contact the bank to reset a user account PIN or obtain a replacement ATM card when the user believes his PIN may have been compromised. The ability to generate an OTP, especially in the embodiment described herein where a PIN input to the user device is not required to generate the OTP, is an additional convenience. Another layer of security can be provided where the OTP generator is further protected using a machine derived identification parameter (MESC) which is unique to the user device or machine used to host the OTP generating application.

The OTP input interface may be a keypad or pinpad on the terminal whereby the user may use the keypad to input the OTP, a receiver for an electronic signal or datum transmitted from the user device directly, or transponder or a scanning device. In the instance where the OTP input interface is configured as a scanning device, the OTP may be an instruction to the user to provide a biometric parameter, for example, a retinal print or fingerprint, or to speak a word or phrase as a voice print, to the scanner interface. Further, the OTP may be provided using any of a number of contactless communication technologies, including but not limited to Bluetooth, RFID, transponders, proximity card communication techniques, and other methods known to those skilled in the art of near field communication technologies.

Figure 1:
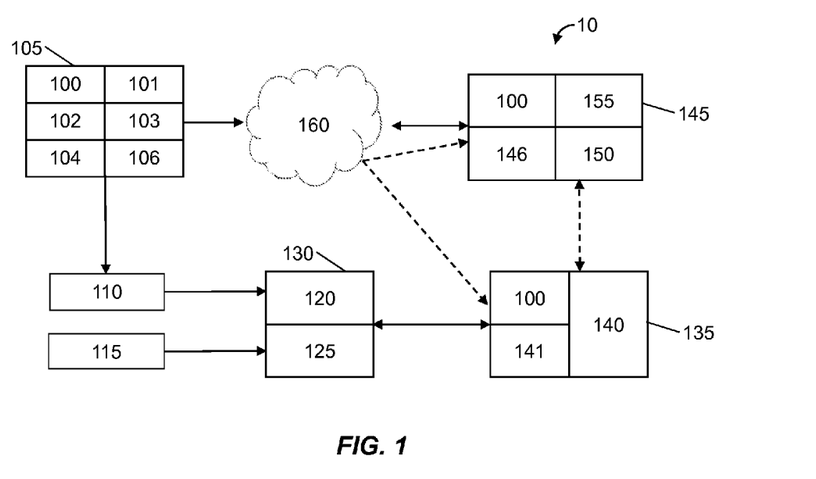
FIG. 1 is a schematic illustration of a system for providing a one-time passcode (OTP) from a user device.

Referring to the drawings, wherein like reference numbers correspond to like or similar components throughout the several figures, there is shown in FIG. 1 a schematic illustration of a system 10 for providing a one-time passcode (OTP) 110 from a user device 105. The user device 105 may be a mobile phone, a smart phone (iPhone™, Blackberry™, etc.), a PDA, netbook, notebook or other handheld or mobile device configured for communication with a network 160. An OTP generating application 100 may be provided to the user device 105 from a provisioning server 155. The OTP application 100 may include an OTP generator to generate an OTP for a user ATM or debit card, or a user account, which may be identified on the user device 105 by a logo or other label associating the OTP generator with the user's ATM or debit card, or the provider system 145 which has issued the user's ATM or debit card. In a non-limiting example, the provider system 145 may be a financial institution such as a bank which has issued the user's ATM/debit card 115. The OTP application 100 can be selected as an application on the user device 105, through an input/output means 101, which may be a touchscreen, for example. The OTP generator and OTP application 100 on the user device 105 may be configured to provide a one-time passcode (OTP) 110 to the user device 105 each time a user request for an OTP 110 is initiated, e.g., each time a new transaction is conducted.

The user device 105 may be a user device such as a mobile phone, a PDA, a handheld or portable device (iPhone, Blackberry, etc.), a notebook, personal computer, note pad or other user device configured for mobile communications, including communication with a network 160. The mobile device 105 is configured to communicate with the network 160 through an interface 102, which may be a modem, mobile browser, wireless internet browser or similar means suitable for accessing network 160. The user device 105 may be further configured with an OTP generating application 100 which may include one or more OTP generating algorithms configurable to generate an OTP 110 using an OTP key configured as a camouflaged cardstring or other key or secret which may be provided to OTP application 100 or stored in a database or file system 103 on user device 105. The OTP application 100 may include a fingerprint code (FPC) executable to collect information from and unique to the user device 105. The OTP generating application 100 may further include an MESC generator configured to generate a machine identifier defined by a MESC of the user device 105, using FPC information collected from the user device 105 using the FPC.

The user device 105 further includes a memory 104 and a central processing unit (CPU) 106. The memory 104 of the user device 105 can include, by way of example, Read Only Memory (ROM), Random Access Memory (RAM), electrically-erasable programmable read only memory (EEPROM), etc., i.e., non-transient tangible machine memory of a size and speed sufficient for executing one or more algorithms included in OTP application 100 activated on user device 105 including, for example, one or more OTP generating algorithms, FPCs, and or MESC generating algorithms. User device 105 is configured to provide an input/output 101 which may be configured, for example, as a keypad and display, a touch screen, or a combination thereof configurable to display, for example, a menu, a generated OTP 110, a challenge or other information associated with OTP application 100, information input into or received by device 105 such as information provided through or selected from input/output 101.

The provider system 145, which in a non-limiting example may be the account provider issuing the user's ATM/debit card 115, may also include an interface 146, which may be a website, through which a user may enroll to receive an activation code to obtain, download and install the OTP application 100 to the user device 105. The provisioning server 155 receives requests through the provider system 145 for OTP enrollment according to an enrollment process, such as the method 20 shown in FIG. 2, and downloads and activates the OTP application 100, including an OTP generator corresponding to the user's ATM/debit card 115 on the user device 105 according to an activation process such as the method 30 shown in FIG. 3. The provisioning server 155, as part of the activation process 30, generates an OTP generation key, also referred to as an OTP key, which the provider system 145 may also camouflage under a PIN such as the user account PIN, a machine identifier unique to the user device 105 such as a MESC, or other data element, using a method 40 shown in FIG. 4, for example. The OTP key is used to create the OTP generator which is specific to the user account and provided to the user device 105. By camouflaging the OTP key with a machine identifier unique to the user device 105, such as a MESC described herein, the OTP generator 100 is uniquely associated with the user device 105, providing an additional layer of security.

The provisioning server 155 is configured with a CPU, a memory and a database or file system. The provisioning server 155 may include an OTP generating application 100 which may be configured to generate and/or provide activation codes, OTP generating algorithms, FPCs, MESC generating algorithms, secrets, keys, cardstrings, account information and data elements as described herein, and may further be configured to camouflage datums including secrets and keys which may be symmetric keys, using, for example, the camouflaging method as described herein and one or a combination of a user PIN and a user device MESC. The OTP application 100 may include a FPC executable to collect information from and unique to a user device, such as the user device 105. The OTP application 100 may further include an MESC generator configured to generate a machine identifier defined by a MESC of a user device, such as the user device 105, using FPC information collected from the user device using the FPC. The memory of server 155 can include, by way of example, ROM, RAM, EEPROM, etc., of a size and speed sufficient for conducting provisioning, transactional, authorization and authentication processes or other tasks and processes as described herein.

The provider system 145 further includes an authenticating server 150, to verify an OTP 110 inputted to a transaction interface 130, such as an ATM or POS terminal, as an authentic PIN corresponding to the user's account. The functions of the authenticating server 150 and provisioning server 155 may be provided by a single server, or may be distributed among multiple servers, including third party servers, within the scope of the claimed invention. Following activation of a user's OTP generator, the authenticating server 150 receives from the provisioning server 155 the information required to independently generate OTPs for that user's account, for the purpose of verifying inputted OTPs as authentic PIN inputs for that user's account.

The authenticating server 150 which is configurable to communicate with the network 160 through an interface 146 or another interface (not shown). As discussed previously for server 155, the authenticating server 150 is configured with a CPU, a memory and a database or file system. The authenticating server 150 may include an OTP application 100 which may be configured to generate and/or provide activation codes, OTP generating algorithms, FPCs, MESC generating algorithms, secrets, keys, cardstrings, account information and data elements as described herein, and may further be configured to evaluate and authenticate user OTPs and/or accessing device MESCs, and to independently generate user OTPs and/or user device MESCs for a provider account, for comparison with an inputted user OTP or accessing device MESC, for example, to determine and provide an authorization result, which may be, for example, approval or denial of a payment transaction or request for secure access. The OTP application 100 may include a FPC executable to collect information from and unique to a user device, such as the user device 105. The OTP application 100 may further include an MESC generator configured to generate a machine identifier defined by a MESC of a user device, such as the user device 105, or another accessing device, using FPC information collected from the device using the FPC. The memory of system 150 can include, by way of example, ROM, RAM, EEPROM, etc., of a size and speed sufficient for conducting provisioning, transactional, authorization and authentication processes or other tasks and processes as described herein.

The system 10 includes a transaction interface 130, through which the user conducts a transaction with the user account provider, e.g., with the provider system 145. In a non-limiting example, the transaction interface 130 may be configured as a ATM terminal or POS interface including a PIN input interface 120 and a card (or account information) input interface 125. The PIN input interface 120 may be a may be a keypad or pinpad on the terminal 130 whereby the user may use the keypad to input OTP 110. The PIN input interface 120 may also be a receiver to receive an OTP 110 configured as an electronic signal or datum transmitted from the user device 105 directly, a scanning device where OTP 110 may be an instruction provided to the user on the user device 105 to provide a biometric parameter to the PIN input interface 120, for example, a retinal print or fingerprint to a scanner within the PIN input interface 120, or to speak a word provided as the OTP as a voice print, to the speaker within the PIN input interface 120, or a display from which the user must select an image corresponding to an OTP 110 image or instruction provided on the user device 105.

The OTP generator 100 is configured to provide an OTP 110 in the same configuration as a user account PIN for the particular transaction interface 130. For example, the typical user account PIN for an ATM or debit card 115 is a four-digit numeric string. In this instance, the OTP generator would provide each OTP 110 as a four-digit numeric string, e.g., in the same configuration as the static account PIN. Because the OTP 110 is configured the same as a static PIN, the user can readily input the OTP 110 into the PIN input interface 120, to be transmitted to the transaction server 140. The authenticating server 150, which is in communication with the transaction server 140, through a network-enabled or non-network (direct) connection, will recognize the OTP 110 as generated by an OTP generator, either by association with an OTP enabled account number, or other similar means, and will validate it accordingly.

The configuration of OTP 110 is not limited to a numeric sequence, as would be typical for an ATM card pin. OTP 110 may be configured in any means which can be provided from the user device 105 and inputted into a PIN input interface 120. For example, the OTP may be configured as one of or a combination of a character string of one or more alphanumeric or special characters, a MESC, a datum or an electronic signal transmittable from the user device, a datum or an electronic signal generated by the user device, or as a user instruction or response to a user instruction, for example, an instruction to provide a retinal or finger print. These examples are not intended to be limiting in scope, and it would be understood that any form of OTP which may be input into the provider interface may be used.

The ATM or POS terminal 130 may include a card reader interface 125 for reading the ATM/debit card 115. The user's ATM/debit card 115 is configured to be read by the card reader interface 125, which may include, respectively, a magnetic stripe and magnetic stripe reader, or respectively, a smart chip and a chip reader, by example. The example of an ATM/debit card 115 and the use of the term "card" as a representative media to provide the user account information is not intended to be limiting in scope. Other forms of a "transaction card" or media 115 to provide the user account information are possible in the method and system described herein. For example, the user account information may be provided from a Speedpass™ or similar chip-RFID transponder or contactless payment method, a USB, a Chipcard, another chip-enabled device, or other media or signal form which may be configured to be readable by a account information input interface 125. Further, the ATM/debit card 115 may provide account information to the ATM or POS terminal 130 using any of a number of contactless communication technologies, including but not limited to Bluetooth, RFID, transponders, proximity card communication techniques, and other methods known to those skilled in the art of near field communication technologies. Alternatively, the ATM or POS terminal 130 may be configured to accept "card not present" transactions, as would an online transaction interface, where input to the card reader 125 may be manual input of an account number or portion thereof, submitted in conjunction with OTP 110 to verify the transaction.

As shown in FIG. 1, ATM/POS terminal 130 is in operable communication with a host system 135, which may, in a non-limiting example, be an ATM host bank or a POS hosting system for a retail POS network. The host system 135 includes a transaction server 140 for the processing of ATM/debit card transactions originating from an ATM/POS terminal 130. The processing functions of the transaction server 140 may include confirmation of the transaction details, e.g., the transaction amount, availability of funds, etc., and may also include transmitting ATM/debit card account information and the corresponding PIN information to the authenticating server 150 for verification and authentication of the transaction, prior to authorizing and executing the transaction. The transaction server 140 may be part of the hosting system 135, may be part of the provider system 145 or may be a hosted by a third party.

The transaction server 140 may be configured with interface 141, which may be a modem, browser or similar means suitable for accessing network or internet 160. Interface 141 may be configurable to communicate with one or more authenticating and/or provisioning systems, for example, provisioning server 155 and authenticating server 150, through network 160 or directly without accessing the network 160, where the accessible provisioning and authenticating server(s) 155, 150 may be a hosting system for provider server 140 or vice versa. The transaction server 140 may correspond to a provider which may be a bank or other financial institution engaged in issuing, for example, EMV standard Visa or MasterCard debit and/or credit cards and processing payments associated therewith. The transaction server 140, in a non-limiting example, may be a merchandiser or service or utility provider which utilizes EMV standard Visa or MasterCard payment systems to conduct business. In another non-limiting example, the transaction server 140 may be a provider of services or transactions which require a user or provider account holder to securely access the provider system 145, to be authenticated to the provider system 145, or to provide secure authorization to the provider to conduct transactions.

The transaction server 140 is configurable to communicate with network 160 through a provider interface 141, for example, a provider website. The transaction server 140 is configured with a CPU and a memory, and may include an OTP application 100 which may be configurable to generate OTPs, keys, secrets or other data elements, which may be stored in a database or file system. The OTP application 100 may include a FPC executable to collect information from and unique to a user device, such as the user device 105. The OTP application 100 may further include an MESC generator configured to generate a machine identifier defined by a MESC of a user device, such as the user device 105, using FPC information collected from the user device using the FPC. The memory of the transaction server 140 can include, by way of example, ROM, RAM, EEPROM, etc., of a size and speed sufficient for conducting provider transactional, provisioning, authorization and authentication processes or other tasks and processes related to OTP based methods, and for configuring, providing and/or activating algorithms, keys, secrets, and other data elements related to provider accounts, or to the methods and systems described herein. It would be understood that the provider system 145 may comprise the transactional server 140, the provisioning server 155 and the authenticating server 150, in communication with each other, or otherwise configured, for example, such that the transactional, provisioning and authenticating processes may be commonly hosted on one or more shared servers.

Figure 2:
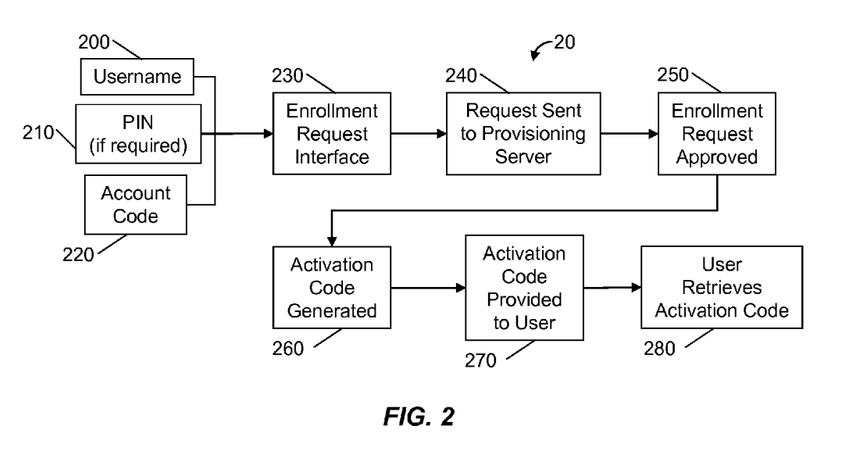
FIG. 2 is a schematic illustration of an activation process.

As generally shown in FIG. 1, the system 10 operates whereby a user (not shown) contacts the provider system 145 by a method shown in FIG. 2 to enroll their user account, which in a non-limiting example is the account associated with the user's ATM/debit card 115, for OTP provisioning. The user receives an activation code through mail, email, as a SMS or text message, in a voice mail or by other means, which may be used to access and download the OTP application, including an OTP generator 100 configured for and corresponding to the user's ATM/debit card 115, from the provisioning server 155 to the user device 105, according to a method shown in FIG. 3.

Figure 5:
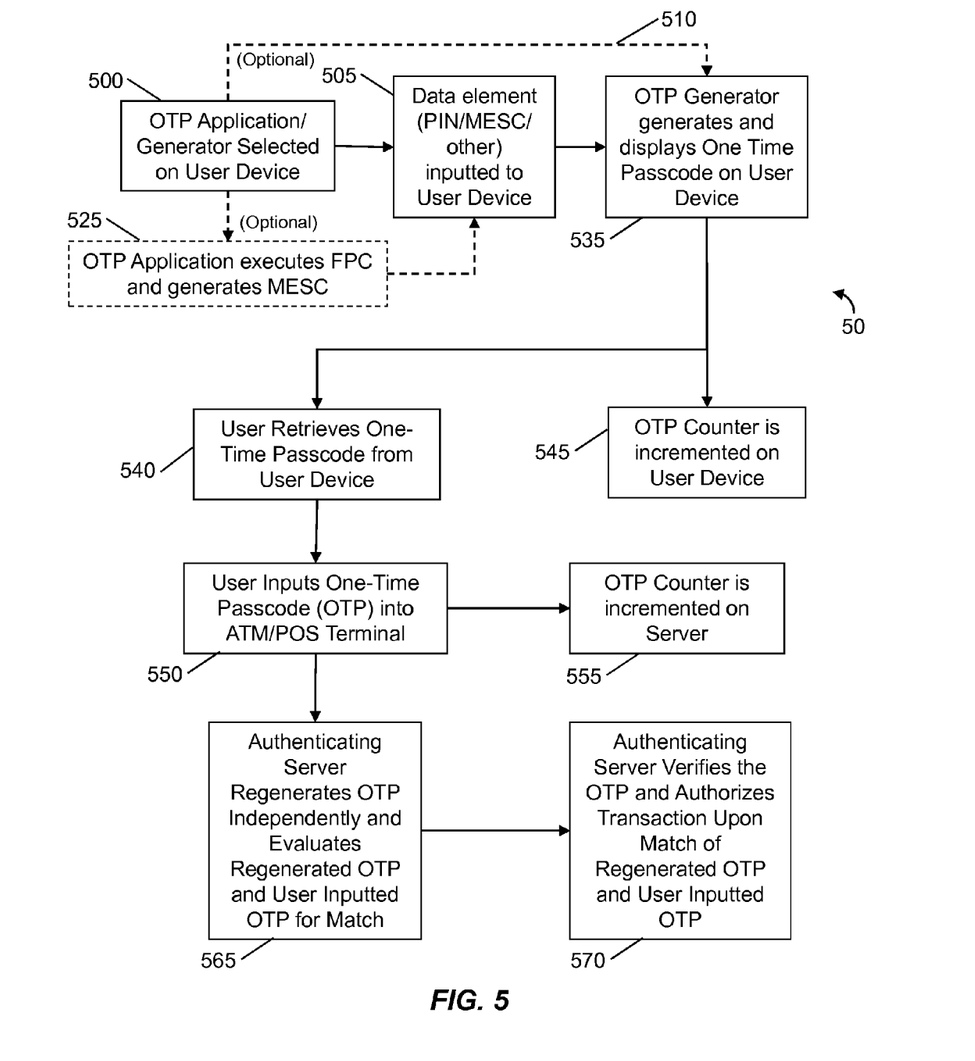
FIG. 5 is a schematic illustration of a process to obtain, from a user device, an OTP to authorize a transaction.

The user, to complete a transaction, for example, to withdraw funds from ATM terminal 130, selects the OTP application 100 on their user device 105, using a method generally illustrated in FIG. 5. The OTP generator 100 generates an OTP 110 and displays the OTP 110 on the user device 105, in the instance where the OTP 100 is configured as a human readable character string. It is understood that the OTP 110 may be provided to the user device 105 in other configurations, for example, as a datum or signal which may be provided to the input interface 125 by other methods as discussed previously. The user inserts ATM card 115 into the ATM card reader 125 (or otherwise provide the ATM account information to the input interface 125, as discussed previously), enters OTP 110 into the ATM PIN keypad 120 (or otherwise provides the OTP 110 to the input interface 120, as discussed previously), and enters other details of the transaction as required, for example, the amount of funds to be withdrawn.

The ATM terminal 130 conveys the transaction information, including ATM card 115 information, OTP 110 and, in the present example, the funds withdrawal request, to the hosting system 135, which conveys the transaction information to transaction server 140, which may be part of the hosting system 135 or user's card issuing system, e.g., the provider system 145. The information is received by the transaction server 140 for processing, which typically includes contacting the provider system 145 to verify the user account information received from the user ATM card 115, funds availability in the user's account sufficient to satisfy the withdrawal request, and the authenticity of the user provided PIN, in this case, the generated and inputted OTP 110.

The authenticating server 150 receives the generated OTP 110 for verification. The authenticating server 150 may be configured, for example, during the activation process, with an equivalent method to generate OTPs 110 associated with the user's ATM/debit account. The authenticating server 150 may independently generate an authenticating OTP, using an OTP generator configured the same as the OTP generator provided to the user's device during activation, and compare the inputted generated OTP to the authenticating OTP to determine a match. The authenticating server 150 may compare the inputted OTP to a database or index of verifiable user OTPs for the user's ATM/debit account. The authenticating server 150 may use other methods, such as requesting a "fresh" MESC from the user device providing the generated OTP during the OTP request sequence, to be used for comparison to a MESC provided by the user device 105 during the activation process, to determine whether the accessing device is the user device 105 or another (intruder or non-authorized) device.

If the user inputted OTP 110 is matched to a verifiable user OTP for the user's ATM/debit account, the OTP 110 is authenticated to the transaction server 140. If all other non-OTP transaction criteria are also met, e.g., funds availability, the transaction server 140 authorizes and executes the funds disbursement to the user by ATM 130. The OTP 110 is then invalidated in the authenticating server 150 such that the OTP 110 used for the withdrawal transaction cannot be reused for a subsequent transaction attempt with the user's ATM/debit card 115.

FIG. 2 shows a schematic illustration of a process to provide an activation code through a representative provisioning implementation or enrollment sequence 20. A user cardholder contacts the provisioning server 240 via an interface, for example, through a web session, typically through an OTP enrollment website or interface at step 230, which may be hosted by the provider system 145 of FIG. 1, and creates or provides a username 200, a PIN 210, and an account code 220. The username 200 and PIN 210 may be created by the user cardholder or may be provided by the card issuer or provider. The PIN 210 may be the static PIN associated with the user's ATM/debit card account. The OTP enrollment website at step 230 forwards the cardholder inputted information with a request for OTP enrollment for the user's ATM/debit account to the provisioning server at step 240. The server at step 250 approves the request and at step 260 generates a strong "Activation Code" which is provided to the user cardholder at step 270, for use in activating the OTP application on the user device. Alternatively, the OTP activation code may be sent to the used cardholder by mail, a short message system (SMS) text message, voice message or other individualized means. The user retrieves activation code at step 280 for use in an activation sequence such as the activation sequence shown in FIG. 3.

During the enrollment session, the user may also be prompted to elect rules regarding the use of the OTP and the static account PIN associated with the user's account. For example, the user may elect to disable the static PIN for POS and online transactions, to decrease the risk of theft and/or compromise of the account PIN online. The user may elect to allow the use of either the static PIN or the OTP at an ATM. As another example, the user may elect to limit the use of the static PIN to three sequential transactions, to limit exposure in the event the static PIN is stolen or compromised, but to retain a limited number of transactions that can be authorized by the static PIN, in the event the user's device becomes lost or disabled or otherwise unavailable to provide an OTP for the user's legitimate transactions.

Figure 3:
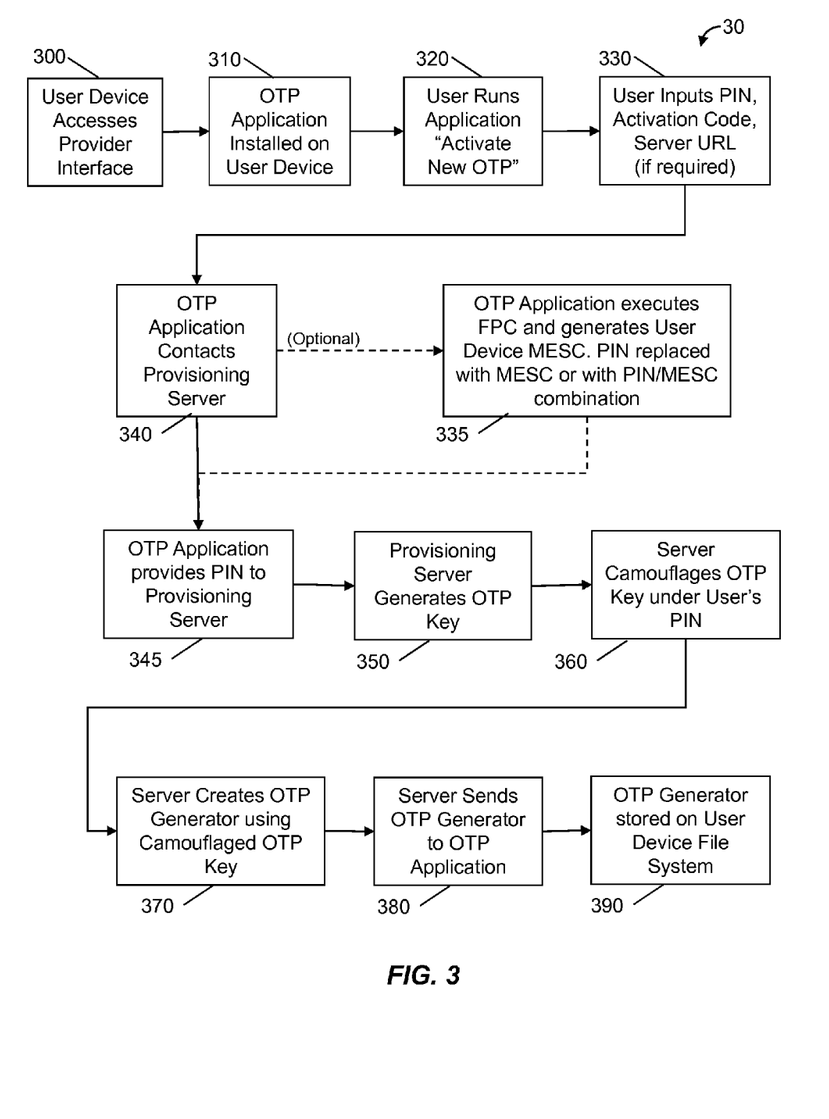
FIG. 3 is a schematic illustration of a process to provide a camouflaged OTP generator to a user device.

FIG. 3 shows a schematic illustration of a typical activation sequence 30, which provides a camouflaged OTP generator capable of generating OTPs to a user device 105. Beginning with step 300, the user cardholder accesses the provider interface, for example, through an OTP application activation website using the cardholder's user device 105. The OTP application 100 is provided or installed at step 310 on the user's device 105. The user runs the installed OTP Application at step 320 by selecting "Activate New OTP" or "Activate New Card Passcode" or similar, from the OTP Application menu. The user, at step 330, inputs a PIN 210 which may be the account PIN, and the OTP activation code retrieved in step 280 of the method of FIG. 3. The user may also be required to input the URL of the provisioning server 155 at step 330, if the URL is required and not provided by default.

Optionally, a machine identifier which is unique to the user device 105, for example, an MESC, may be generated at step 335 of FIG. 3, to enable an additional level of security by associating the OTP application 100 on the user device 105 with that particular user device 105. The unique MESC identifying the user device 105 is generated from data collected from and unique to the user device 105. In the event the OTP application 100 is configured to incorporate the MESC in the OTP generating process, at step 335, the OTP application 100 executes a FPC. The FPC in one embodiment is a lightweight and portable client with no footprint, such as JavaScript, Flash or pure Java, although it is understood any lightweight code, including generic code, could be used for the FPC.

At step 335 the FPC collects FPC information from the user machine 105 and transforms the collected FPC information into a unique MESC identifying the user device 105. The MESC may be used as a substitute for the PIN provided during the OTP request process, by freshly generating the MESC for each OTP request, and/or to camouflage the OTP generating key to secure the OTP generating application 100 to the specific user device 105. The MESC is generated by utilizing and exploiting the inherent and unavoidable variability in the manufacturing processes used to produce the components of the user device 105. The method provided herein uses the knowledge that the speed of any machine (herein, a user device such as a mobile phone, PDA, netbook) is unique to that individual machine. Any two machines that have the same specified speed (two computers each specified at 3 GHz and identically configured, for example) will have actual speeds that are different. Therefore, if the same program, e.g., FPC, is run on each of these two machines, the run time on each of the two machines will be different. Accordingly, the time it takes to run a standard piece of code on each machine can be used as a unique signature for each machine. This machine signature can be transformed into a MESC which can be generated to identify a particular user machine during an initial activation session or repeatedly, e.g., during subsequent use of the OTP generator by the user. The MESC can be used to camouflage the OTP generation key and create the OTP generator which is then stored on the user device 105. When the user subsequently requests an OTP from the user device 105, the method to generate the MESC can be repeated by the OTP application 100 on the user device 105 and the fresh (newly generated) MESC can be provided as a required data element or PIN to generate the OTP 110. This process of providing the MESC to generate the OTP may occur automatically, without input from the user, increasing the convenience of obtaining an OTP 110 by eliminating user input of a PIN during the OTP request session.

In this configuration, where the MESC is used in the OTP generating process, the authenticating server 150 will regenerate the OTP 110 independently by using the MESC generated during the activation session, to determine an OTP match for transaction authorization. Alternatively, the authenticating server may generate an MESC from the device conducting the transaction, and use this MESC to determine an OTP match and/or to determine is the device conducting the transaction is the user device 105 or another (intruding or non-authorized) device, thereby providing an additional layer of authentication and security.

The FPC information collected by the FPC during the activation session may include user machine information, for example, machine hardware and software configuration, serial numbers and versions; processor speed, memory speed, graphics capabilities, memory latency, actual and relative machine load, power supply characteristics, battery power level, or other machine information collected from at least one of a machine processor, memory, hard disk or graphics card of the user device. The machine information may also include machine information resultant from executing the FPC, for example, the run-time of one or more iterations of a portion of the FPC, or the number of iterations completed by a portion of the FPC in a fixed amount of time. The machine information is transformed into an MESC.

Because an MESC is derived using the actual speed characteristics of the particular user machine, and because the actual speed characteristics of the particular machine are the result of a combination of components which are non-identical due to at the least, the manufacturing variability of each component, the MESC will be unique to that user machine. An MESC may be calculated by various methods, for example, using the runtime of one or more iterations of a portion of the FPC, an average of runtimes of multiple iteration of a portion of the FPC, or by using the number of iterations completed by a portion of the FPC in a fixed amount of time. As another example, an MESC may be calculated by determining an average or other statistical parameter to a sample group of a characteristic represented in the session information, or applying a clustering algorithm to various elements or characteristics of the session information. In an optional step 335 of FIG. 3, the user device MESC may be used as a substitute for the PIN, or may be combined with the PIN and the combined element provided to the provisioning server 155 at step 345.

At step 340, the OTP application 100 contacts the provisioning server 155 and provides the PIN, and as discussed previously, may also provide the MESC or a combination of the MESC and the PIN, in addition to or in substitution for the PIN. The provisioning server 155, at step 350, generates an OTP generation key defined by the user account being provisioned for OTP. By way of non-limiting example, the OTP key may be generated for an ATM/debit card that is smart chip enabled, by applying an EMV modified data key (MDK) to the user's ATM/debit card account number, to generate account-specific UDKA and UDKB keys. The OTP key, as discussed previously, may be a symmetric key, a DES key, an AES key, a non-symmetric key, a secret, a secret byte array, a UDKA, a UDKB, a seed or a key associated with an indexed key list, for example, where the OTP key is defined by the user account to which it is associated. The provisioning server 155, at step 360, camouflages the UDKA and UDKB keys under a user PIN which may be the account PIN, a MESC unique to user device 105, or a combination thereof, using a method such as the method provided in FIG. 4. Other camouflaging, encryption or obfuscation methods may be used, within the scope of system and methods described herein, to camouflage the OTP generation key.

Continuing with FIG. 3, at step 370, the server creates an account-specific OTP generator using the camouflaged OTP generation key and sets the user device OTP counter and the authentication server OTP counter each to zero (0) for the OTP generator. The OTP algorithm included in the OTP generator may be an ARQC generating algorithm in compliance with EMV standard protocol, or may be an OATH-approved standard HOTP, which is a counter-based OTP algorithm generated using a HOTP secret, where the OTP key may be a secret byte array. The provisioning server 155 at step 380 sends the OTP generator to the OTP application 100 on the user device 105. At 390, the OTP application 100 stores the OTP generator in the user device file system, completing the activation sequence for the user account. It is understood that the user may activate more than one ATM/debit card or PIN-required account through the user device 105 and the OTP application 100, by activating and providing an account-defined OTP generator for each activated account or card to the OTP application 100. The OTP application 100 may be configured to display a menu or listing of the OTP generators activated on the user device 105, wherein each OTP generator may be identifiable to the particular card, account, or card/account provider.

Figure 4:
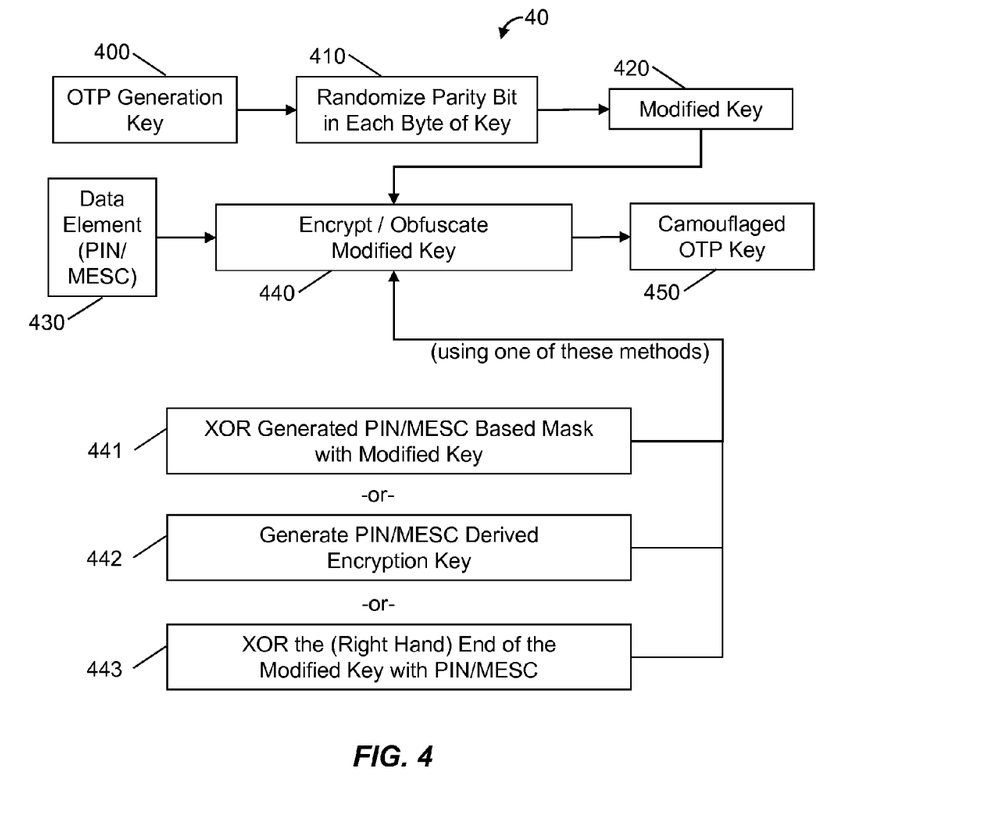
FIG. 4 is a schematic illustration of a process to camouflage an OTP generation key.

FIG. 4 shows a schematic illustration of a method 40 to cryptographically camouflage a software key, which in a non-limiting example is an OTP generation key, also referred to as an OTP key. As shown in FIG. 4, an OTP generation key, also referred to as an OTP key, is provided at step 400 to a camouflaging process generally indicated at 40. The OTP key may be of any symmetric key type, for example, the OTP key may be a DES (Data Encryption Standard) key. A DES key is of size 8 bytes. In each byte, bits 2 through 8 are random, and the first bit is a parity bit. The first bit is nothing but the parity of bits 2 through 8. These parity bits are not needed to perform cryptographic actions with a DES key. In a non-limiting example, the OTP key is configured as a DES key, and is camouflaged under a PIN, a MESC, another data element or datum, or a combination of two or more of these. The PIN may be, for example, the account pin associated with the user's ATM/debit card account, and the MESC may be a MESC unique to the user device 105.

To camouflage an OTP key under a PIN, MESC or combination thereof, the following steps are performed, as shown in FIG. 4. An OTP key is provided, which is a DES key in the embodiment shown. The OTP key may be defined by the user's account, for example, it may be derived from the user's account number or debit card number. In a first camouflaging step 410, the parity bit in each byte of OTP key is randomized, to produce a modified key at step 420. A data element is provided at step 430, and the modified key is encrypted or obfuscated in a second camouflaging step at step 440 using the data element provided at step 430 and a method of encryption/obfuscation which may be, in a non-limiting example, one of the methods 441, 442 or 443 shown in FIG. 4, or a combination of these. In a non-limiting example, the data element provided at step 430 may be a PIN, a MESC, another data element or datum, or a combination of two or more of these.

Three possible methods of encryption or obfuscation 441, 442, 443 are shown in FIG. 4. Method 441 uses a Mask Generation Function to create a mask from the data element (PIN, MESC, etc.) provided in step 430 and XOR (Exclusive OR) the mask with the modified key 420 to provide a camouflaged key at step 450. Method 442 encrypts the modified key 420 with a new key derived from the data element (PIN, MESC, etc.) provided at step 430 to provide a camouflaged key at step 450. When using method 442, no padding or other information should be stored that can help an intruder recognize a failed decryption attempt with a wrong data element, e.g., e.g., a data element other than the PIN, MESC, or other data element provided at step 430. A third possible method 443 provides XOR the (right hand) end of the modified key 420 with the data element (PIN, MESC, etc.) provided in step 430 to provide a camouflaged key at step 450. While three possible methods are described herein to encrypt or obfuscate a modified key to provide a camouflaged key, those familiar with the art to which this invention relates will recognize various alternative methods and embodiments can be employed for encrypting or obfuscating a modified key to provide a camouflaged key within the scope of the claimed invention.

Additionally, each of these method of camouflaging may be accomplished using a combination of a PIN and a MESC, or a layered encryption of the modified key by encrypting the OTP key first using one of the PIN and the MESC and one of the methods 441, 442, 443 to produce a first camouflaged key, and then encrypting the first camouflaged key with one of the PIN and the MESC and one of the methods 441, 442, 443 to produce a second camouflaged key which is provided to step 450. Note that an attacker using a brute force attack with all possible PINS or MESCs, and who has full knowledge of the camouflage algorithm 440, will always produce a validly formatted OTP key, except for the parity bits. The attacker has no way of recognizing when the correct data element (PIN, MESC, etc.) has been used with the camouflage algorithm 440.

FIG. 5 shows a schematic illustration of a usage process 50 to obtain, from a user device, an OTP to authorize a transaction, which by way of non-limiting example may be an ATM or debit transaction. The user, at step 500, selects an OTP generator corresponding to the user's ATM/debit card from the OTP application 100 on the user device 105. At step 505, the user may be required to provide data element, which may be a PIN and/or MESC or other data element, according to the configuration of the OTP application 100. In a first configuration of the OTP application 100, the user, at step 505, inputs a PIN which may be the account PIN, to the user device 105 to authenticate the user to the OTP application 100, and the method proceeds to step 535. As discussed previously, the PIN may be configured as a character string which can be input, for example, through a keypad or touchscreen of the user device 105.

Other PIN configurations are possible, for example, the user may prompt the user device to transmit a datum or an electronic signal from the user device as a PIN, or the user may be required to select a picture or graphic from the device screen as a PIN, input a challenge transmitted to the user, for example, as an SMS or text message, or to input a biometric parameter such as a voice print, by speaking a certain word or phrase into the device, a retinal scan to the device's camera, or a fingerprint to a print pad on the device as a PIN. These examples are intended to be non-limiting, and it is understood that other PIN configurations are possible.

In a second (optional) configuration, the OTP application 100 triggers the execution of a FPC at step 525 to generate a MESC for the user device 105. The user device MESC is provided as the data element used to authenticate the user to the OTP application 100 and the method proceeds to step 535. In this configuration, input of a PIN from the user at step 505 may or may not be required. The MESC may be substituted for the PIN, increasing the convenience of retrieving an OTP by eliminating the PIN input step for the user. Further, the security of the transaction is increased because the MESC is generated as a "fresh" MESC using FPC information which is unique to the accessing device and collected at the time the user selects the OTP generator at step 500, e.g., at the time the transaction is being conducted. Therefore, for a transaction initiated from the user device 105, is the MESC would be generated with fresh FPC information collected from and unique to the user device 105.

It would be understood that if the OTP application 100 has been ported to or installed on another device other than user device 105, which for illustrative purposes may be referred to as a non-authorized or intruder device, the MESC generated using FPC information collected from the intruder device would be unique to the intruder device. The "fresh" MESC generated from the intruder device would not match the MESC provided by the user device 105 to the provider system 145 during the activation process of FIG. 3. The "fresh" MESC can be therefore be used in multiple ways to further authenticate, secure and/or protect the user, user device 105 and ATM/debit account OTP generator. As one example, the fresh MESC can be provided as a PIN, which, if the fresh MESC is generated from an intruder device, will be recognized by the authenticating server 150 as non-matching to the MESC of user device 105 and therefore generated by a non-authorized device and non-verifiable. A non-matching MESC may trigger, for example, the OTP application to display an OTP which may be recognized as an alert code by the authenticating server 150. Upon recognizing the MESC as a non-matching MESC or as an alert code, the authenticating server may request additional authenticating information, increase security requirements, decline the transaction, and/or store the OTP and/or the PFC information for detection or identification of the non-user device attempting to execute the OTP application.

In a third (optional) configuration, step 505 is not required to authenticate the user to the OTP application 100 and the method proceeds via 510 from step 500 to step 535. In this case, the OTP application proceeds directly to step 535 when the user selects the OTP generator or OTP application 100 on the user device 105.

At step 535 the OTP generator generates and provides an OTP 110 on the user device 105. The OTP application 100, after generating the OTP, increments the OTP counter on the user device 105 at step 545. The user, at step 540, retrieves the OTP 110 from the device 105, and inputs the OTP 110 at step 550 into the ATM/POS terminal 130 at step 550, by one of the other methods discussed herein.

The authenticating server 150, upon receipt of the inputted OTP 110 and other inputted information from the ATM/POS terminal, for example, a requested transaction amount and/or the ATM/debit card information, increments the OTP counter on the server 150 at step 555. The server 150, at step 565, generates an authenticating OTP or retrieves a list or index of acceptable, e.g., authentic, OTPs for the user's ATM/debit account, which may have been generated, for example, during the activation process of FIG. 3. The authenticating server 150 compares the inputted OTP, to the authenticating OTP and/or list of acceptable OTPs at step 565. Upon successful match or verification of the inputted OTP to an authenticating or acceptable OTP, the server at step 570 authenticates the inputted OTP, e.g., determines the inputted OTP is an authentic OTP for the user account, and provides an authorization result to the transaction interface 130. In the case of a successful match of the OTP to an authenticating OTP or one of a list of acceptable OTPs, the authorization result would be an authorization for the transaction to proceed. It would be understood that in the case where the inputted OTP could not be verified, e.g., where the inputted OTP was determined to be non-authentic, the authenticating server 150 would provide a negative authorization result to the transaction interface 130, for example, denying the transaction or requesting the user to input another OTP for evaluation and verification. While the example shown in FIG. 5 is an ATM or POS transaction, it is understood by those skilled in the art that a generally similar system could be used for other transactional processes or authorizing and authenticating systems which require PIN authorization and/or verification.

Other variants of the transaction authorization process of FIG. 5 may be used. For example, not shown but understood by those skilled in the art, the OTP application, concurrent with request for an OTP, may contact the server to request a challenge. The server sends the challenge to the user, by a predetermined process, for example, through an email, as an SMS (short message service) or text message to the user device, or via a phone call or voicemail message. The user retrieves the challenge through appropriate means, and inputs the challenge as a required data element prior to step 535. The process may use the challenge in the OTP generation sequence. Optionally, the user may be required to input a different data element, for example, a secondary PIN or the amount of the purchase transaction for comparison in the authentication process. Alternatively, the user may input an alarm or alert code, notifying the server to provide a non-valid OTP or to terminate all authorization until reactivated, for example, in the event of a stolen user device or personal security threat.

Additional features and advantages are possible using the OTP application 100 activated on the user's device (phone, PDA, iPhone™, Blackberry™). For example, and assuming for descriptive purposes the User Device is an iPhone™, the OTP application 100 can store a plurality of OTP generators, each corresponding to one of a plurality of ATM cards, debit cards, and other PIN authorized payment or transaction cards or accounts controlled or owned by the user, including cards/accounts from different issuers or providers, eliminating the need to memorize multiple PINs or store multiple PINs using a storage method which may be readily compromised. The OTP counter on the user device 105 can be reset using the OTP application 100 on the user's device, by the user manually or through application-server communication enabled by the user device, eliminating the inconvenience of contacting the provider in the event of OTP counter nonsynchrony. The OTP application 100 can be updated automatically and without the need to replace user device hardware or the user card.

The OTP application 100 can be downloaded and activated on multiple user devices for the same ATM/debit account. As an example, for a joint account, the OTP application could be activated on both of the joint cardholder's user devices, which also could be of different types, for example, an iPhone™ and a Blackberry™, with transparency to each joint account holder user. Each user can be provided an OTP generator corresponding to the joint account. By including a MESC in the OTP generator creation process that is unique to each joint account holder user device accessing the joint account, each transaction and OTP may be further identifiable to the particular one of the joint account holder's user device conducting a transaction or requesting an OTP.

In the event of multiple incorrect PIN inputs during an OTP request sequence, resetting the OTP generator of the claimed invention can be expedited through a support telephone call and reset of the OTP application on the user device, which can, if necessary, include camouflaging a new OTP key and providing a new OTP generator.

While the above processes are described in detail with respect to transactional systems, including payment systems, those skilled in the art will recognize the broader applicability of the method and system described herein to securely provide, through a user devices such as, for example, an iPhone™ or Blackberry™, laptop, netbook, etc., a one-time passcode (OTP) generated from a cryptographically camouflaged datum, where the datum may be of various types, including but not limited to, for example, symmetric keys, non-symmetric keys, secrets, seeds and indexed key lists, for a broad scope of applications including secure access systems, identity authentication systems, and non-financial authorization systems, e.g., medical related systems. Those having ordinary skill in the art will further recognize that terms such as "encrypt," "obfuscate," "key," "PIN," "server," "website," "code," "challenge," etc., are used descriptively of the figures, and do not represent limitations on the scope of the invention where other terms may be used in an generally equivalently descriptive manner.

While the best modes and other embodiments for carrying out the claimed invention have been described in detail, those familiar with the art to which this invention relates will recognize various alternative designs and embodiments for practicing the invention within the scope of this application and the appended claims.

The invention claimed is:

1. A method, comprising:
   providing a one-time passcode (OTP) application to a user device;
   camouflaging a key using a data element defined by a user account to provide an OTP key associated with the user account, the camouflaging the key comprising using a machine effective speed calibration (MESC) defined by the user device;
   providing the OTP key to the user device; and
   generating the OTP on the user device using the OTP application, the MESC and the OTP key;
   wherein the OTP is configured for input as a PIN into a transaction interface.

2. The method of claim 1, further comprising:
   inputting the OTP to a provider system using the transaction interface;
   determining whether the OTP is an authentic PIN for the user account; and
   providing an authorization result to the transaction interface using the provider system.

3. The method of claim 2, wherein determining whether the OTP is an authentic PIN for the user account further comprises:
   providing an authenticating OTP, wherein the authenticating OTP is generated by the provider system or provided from a list of acceptable OTPs for the user account;
   comparing the OTP to the authenticating OTP to determine a match between the OTP and the authenticating OTP; and
   verifying the OTP as an authentic PIN for the user account when the OTP matches the authenticating OTP.

4. The method of claim 1, further comprising:
   activating a first OTP generator on the user device, wherein the first OTP generator comprises a first OTP key associated with a first user account;
   activating a second OTP generator on the user device, wherein the second OTP generator comprises a second OTP key associated with a second user account;
   selecting a respective one of the first and second OTP generators using the OTP application; and
   generating an OTP using a respective one of the first and second OTP keys associated with the respective one of the first and second OTP generators.

5. The method of claim 4, wherein one of the OTP application and the OTP generator comprises an OTP generating algorithm which is configured as one of a HMAC-Based One-Time Password (HOTP) and an Europay, MasterCard and Visa Chip Authentication Program (EMV/CAP) algorithm.

6. The method of claim 2, wherein the OTP is configured for input as a PIN into a transaction interface as an electronic signal transmittable from the user device or an electronic signal generated by the user device; and
   wherein inputting the OTP into the transaction interface comprises inputting the OTP through use of RFID, contactless, Bluetooth, WiFi, proximity card or near field communication technologies.

7. The method of claim 1, wherein camouflaging the key comprises:
   camouflaging the key using cryptographic camouflage to provide the OTP key.

8. The method of claim 1, wherein the key is a symmetric key, a DES key, an AES key, a non-symmetric key, a secret, a secret byte array, a UDKA, a UDKB, a seed or an indexed key list.

9. A system, comprising:
   a provider system that provides a one-time passcode (OTP) application to a user device, the provider system camouflages a key using a machine effective speed calibration (MESC) defined by the user device to generate an OTP key associated with a user account, the provider system provides the OTP key to the user device; and
   wherein the OTP application is configured to generate an OTP on the user device using the OTP key and the MESC;
   wherein the OTP is configured for input as a PIN into a transaction interface.

10. The system of claim 9, further comprising:
    a transaction interface that receives a PIN;
    wherein:
       the provider system is in communication with the transaction interface and evaluates a PIN input to the transaction interface to determine whether the PIN input is an authentic PIN for the user account;
       the provider system provides an authenticating OTP for the user account; and
       the provider system compares the PIN input into the transaction interface to the authenticating OTP to determine whether the OTP is an authentic PIN for the user account.

11. The system of claim 9, wherein:
    the transaction interface is one of an automatic teller machine (ATM) terminal and a point of sale (POS) terminal; and
    the user account is one of an ATM account and a debit account.

12. The system of claim 9, wherein:
    the provider system provides an OTP generator comprising an OTP algorithm;
    the user device receives the OTP generator comprising the OTP algorithm;
    the OTP algorithm is an HMAC-Based One-Time Password (HOTP) or an Europay, MasterCard and Visa Chip Authentication Program (EMV/CAP) algorithm; and
    the OTP application is configured to generate an OTP using the OTP generator and the OTP key.

13. The system of claim 9, wherein the OTP is configured as an electronic signal transmitted from the user device.

14. A system, comprising:
    a processor that provides a one-time passcode (OTP) application comprising an OTP generator to a user device, the processor receives a machine effective speed calibration (MESC) from the user device, the processor camouflages a key using the MESC to generate an OTP key associated with a user account, the processor provides the OTP key to the user device, the OTP application is configured to generate an OTP on the user device using the OTP generator, the MESC and the OTP key, the OTP is configured for input as a PIN into a transaction interface.

15. The system of claim 14, wherein:
    the transaction interface is configured to receive the PIN;
    the transaction interface is one of an automatic teller machine (ATM) terminal and a point of sale (POS) terminal;
    the user account is one of an ATM account and a debit account;
    the system is in communication with the transaction interface and evaluates the OTP to determine whether the OTP is an authentic PIN for the user account; and
    the processor provides an authorization result to the transaction interface.

* * * * *